United States Patent
Vijay

(10) Patent No.: US 12,110,961 B2
(45) Date of Patent: Oct. 8, 2024

(54) TRANSMISSION SYSTEM FOR AN ELECTRIC VEHICLE

(71) Applicant: Karma Automotive LLC, Irvine, CA (US)

(72) Inventor: Shashank Vijay, Foothill Ranch, CA (US)

(73) Assignee: Karma Automotive LLC, Irvine, CA (US)

( * ) Notice: Subject to any disclaimer, the term of this patent is extended or adjusted under 35 U.S.C. 154(b) by 0 days.

(21) Appl. No.: 17/814,379

(22) Filed: Jul. 22, 2022

(65) Prior Publication Data

US 2022/0356942 A1    Nov. 10, 2022

Related U.S. Application Data

(63) Continuation of application No. 16/822,917, filed on Mar. 18, 2020, now abandoned.

(51) Int. Cl.
*F16H 57/04* (2010.01)
*F16H 57/02* (2012.01)

(52) U.S. Cl.
CPC ......... *F16H 57/0443* (2013.01); *F16H 57/02* (2013.01); *F16H 57/0436* (2013.01); *F16H 57/0447* (2013.01); *F16H 57/045* (2013.01); *F16H 2057/02043* (2013.01)

(58) Field of Classification Search
CPC .......................... F16H 57/0443; F16H 57/0447
See application file for complete search history.

(56) References Cited

U.S. PATENT DOCUMENTS

| | | | | |
|---|---|---|---|---|
| 5,158,152 | A * | 10/1992 | Nemoto | F16N 7/40 184/6.12 |
| 5,372,213 | A * | 12/1994 | Hasebe | B60K 1/02 184/6.12 |
| 6,299,561 | B1 * | 10/2001 | Kramer | F16H 57/0447 184/6.12 |
| 11,326,590 | B2 * | 5/2022 | Claywell | F04B 49/103 |
| 2008/0045368 | A1 * | 2/2008 | Nishihara | F16H 57/0447 475/160 |

(Continued)

FOREIGN PATENT DOCUMENTS

| | | |
|---|---|---|
| CN | 101936383 A | 1/2011 |
| DE | 102007011029 A1 | 9/2008 |

(Continued)

OTHER PUBLICATIONS

International Preliminary Report on Patentability and Written Opinion for Application No. PCT/US2021/023024 dated Sep. 29, 2022.

(Continued)

*Primary Examiner* — Minh Truong
(74) *Attorney, Agent, or Firm* — Honigman LLP

(57) ABSTRACT

A transmission system for an electric vehicle. The system includes a gearbox containing gears and a lubricating fluid. A pump is provided for supplying and removing lubricating fluid from the gear box. The operation of the pump is controlled by a controller. A reservoir is provided for storing lubricating fluid. The controller is configured to control the pump so that a portion of the lubricating fluid is removed from the gear box when the vehicle is involved in a high acceleration event.

18 Claims, 4 Drawing Sheets

(56) References Cited

U.S. PATENT DOCUMENTS

| | | | |
|---|---|---|---|
| 2011/0000332 A1* | 1/2011 | Gianone | F16H 57/0447 |
| | | | 74/606 R |
| 2014/0026988 A1 | 1/2014 | Peterson et al. | |
| 2014/0190428 A1* | 7/2014 | Kikuchi | F16H 57/0417 |
| | | | 123/41.55 |
| 2016/0230841 A1* | 8/2016 | Hiramatsu | B60W 20/50 |
| 2016/0341301 A1* | 11/2016 | Slesinski | F16H 57/0402 |
| 2017/0254408 A1 | 9/2017 | Takemori et al. | |
| 2018/0051801 A1* | 2/2018 | Kim | B60K 6/48 |
| 2018/0058570 A1 | 3/2018 | Osborn et al. | |
| 2019/0234398 A1* | 8/2019 | Endo | F04B 49/20 |

FOREIGN PATENT DOCUMENTS

| | | | | |
|---|---|---|---|---|
| DE | 102014205881 B3 * | 6/2015 | | F16H 57/0441 |
| DE | 102018208287 A1 | 11/2019 | | |
| EP | 0696697 A1 | 2/1996 | | |
| JP | 2008114844 A | 5/2008 | | |
| JP | 2008169873 A * | 7/2008 | | |
| JP | 2018071679 A | 5/2018 | | |
| KR | 20170041317 A | 4/2017 | | |
| WO | WO-2012140963 A1 * | 10/2012 | | B60K 17/046 |

OTHER PUBLICATIONS

International Search Report for Application PCT/US2021/023024 dated Jul. 7, 2021.
USPTO, Office Action relating to U.S. Appl. No. 16/822,917, dated Apr. 18, 2022.
European Patent Office, Extended EP Search Report for Application 21771537.4 dated Mar. 18, 2024.

* cited by examiner

TRANSMISSION SYSTEM FOR AN ELECTRIC VEHICLE

CROSS REFERENCE TO PRIOR APPLICATIONS

This U.S. patent application is a continuation of, and claims priority under 35 U.S.C. § 120 from, U.S. patent application Ser. No. 16/822,917, filed on Mar. 18, 2020. The disclosure of this prior application is considered part of the disclosure of this application and is hereby incorporated by reference in its entirety.

TECHNICAL FIELD

The present disclosure related generally to the field of transmission systems for an electric vehicle. Specifically, a lubricated transmission system for an electric vehicle.

BACKGROUND

The present disclosure related generally to the field of transmission systems for an electric vehicle. Specifically, a lubricated transmission system for an electric vehicle.

In an electric car, efficient use of electrical power is extremely important. There are various different components in a vehicle's drive train, and if any of these components are not operating efficiently the vehicle and its user may be deprived of range, time and power associated with use of the electric vehicle that may otherwise be available. An electric vehicle typically relies solely on stored electric power. Thus, there is a need to convert electric energy to propulsion power as efficiently as possible.

The present application discloses a transmission system for an electric vehicle that improves the efficiency of the power transfer within the transmission system and, thus, provides for increased range, operating time and power for an electric vehicle.

DESCRIPTION OF DRAWINGS

The features, aspects, and advantages of the present disclosure will become apparent from the following description, and the accompanying exemplary embodiments shown in the drawings, which are briefly described below.

DETAILED DESCRIPTION

As disclosed herein, a transmission system for an electric vehicle is provided. The vehicle includes a DC power source to supply power to one or more propulsion motors. The transmission may be used to change the speed of the motor shaft to match the desired speed of the shaft driving a wheel of the vehicle. The DC power source in an electric vehicle may be the main battery of the electric vehicle.

Figure 1:
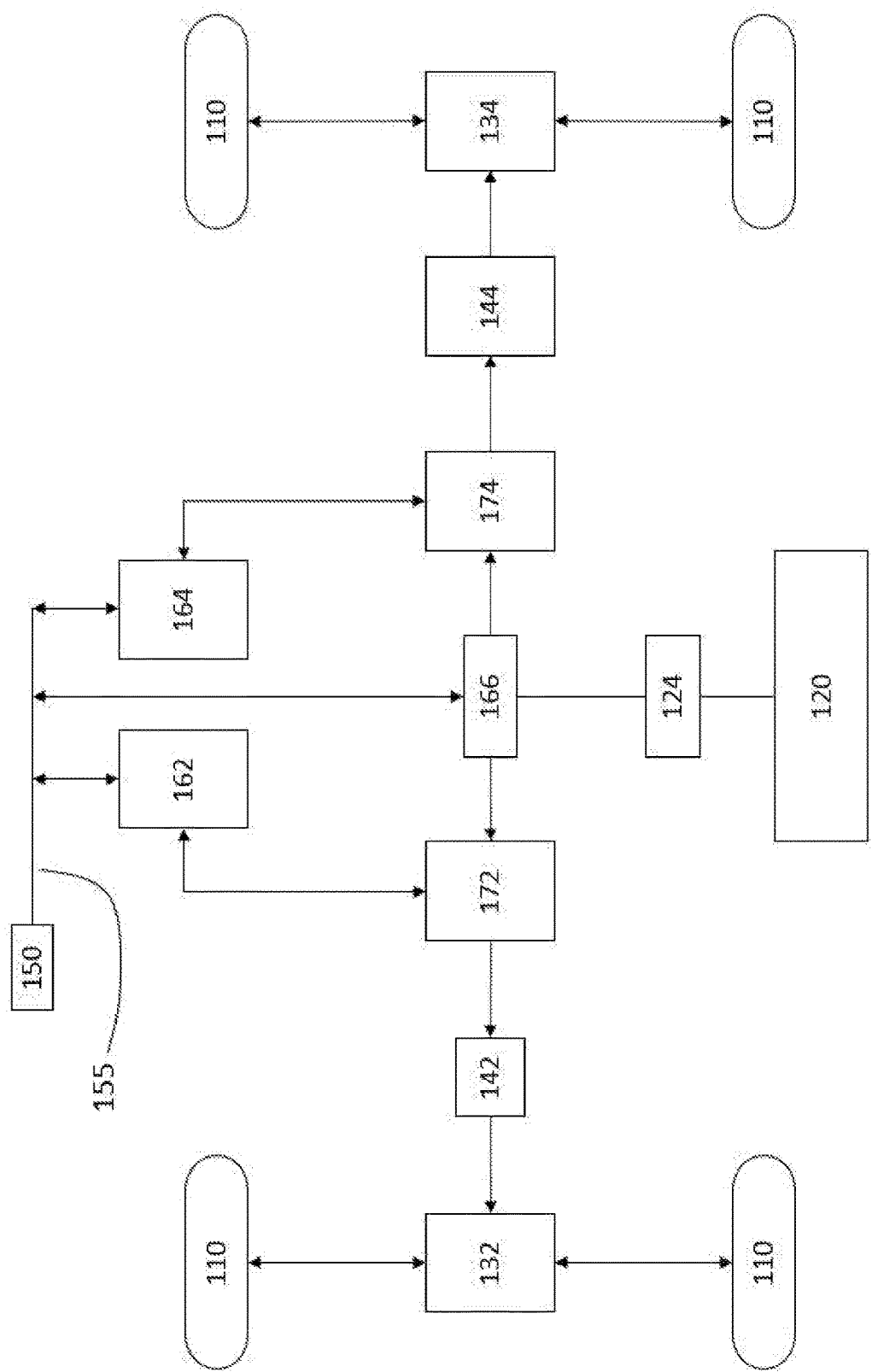
FIG. 1 is a schematic block diagram of various components of an exemplary embodiment of a power train of an electric vehicle.

FIG. 1 shows an exemplary electric vehicle 100 configured to be driven by a pair of propulsion motors 172, 174. The vehicle may include a rechargeable energy storage system 150 (e.g., a battery). The vehicle may also include an engine 120 to provide supplemental power. The engine 120 may generally refer to any apparatus operable to augment power or range beyond the range associated with power provided by the battery 150. For example, the engine 120 may be an internal combustion engine that consumes gasoline. The storage system 150 may be, for example (but not limited to) a high-voltage battery, such as a high-voltage lithium ion battery pack. Operation of the vehicle 100 may be driven by each power source and/or both. The vehicle 100 may include multiple electrical motor/generators 172, 174 that may be operated either as drive motors that convert electrical power to rotational mechanical energy or as generators that convert rotational mechanical energy to electrical energy. The motor/generators are at times referred to simply as motors but, as described herein, include the ability to be driven to generate electricity. The motor/generators may be electrically driven and coupled to the engine 120 and the storage device 150.

According to various embodiments, the vehicle 100 includes a first motor/generator 172 that serves as a motor to drive the front wheels 110 of the vehicle. In the regenerative braking mode the motor 172 may serve as a generator to charge the storage device 150. The vehicle 100 further includes a second motor/generator 174 (e.g., rear wheel drive (RWD) motor) that engages a drive shaft that turns one or more rear wheels 110. One or more intermediate devices, such as a rear gearbox 144 and a rear differential 134, may be provided between the second motor/generator 174 and the rear wheels 110. Similarly, the vehicle 100 may include a front gearbox 142 and a front differential 132, located between the front motor/generator 172 and the front wheels 110.

The vehicle 100 may further includes a generator 124 that is driven by the engine 120 and generates power for propulsion or for charging the battery 150. As further described below, the gearboxes 142, 144 may be single speed gearboxes or multi-speed gearboxes. The motor/generators 172, 174, 124 and the battery 150 may be coupled to a common DC bus 155. In some embodiments, the generator 124 and motor/generators 172, 174 may be AC devices and electric conversion devices such as inverters 162, 164, 166 may be coupled between the motor generators and the DC bus 155. The vehicle 100 may be operated normally as a RWD vehicle, with the front wheels only powered when needed for additional power or traction.

When the vehicle accelerates or increases energy consumption, speed of the drive motors increase to deliver more power or energy to the wheels 110. The turning of the motors may be reversed to provide regenerative braking, which provides the impression of downshifting the vehicle 10. This also generates energy that may be stored in the battery 150. Accordingly, in some embodiments, the vehicle 100 may actuate regenerative braking to slow the vehicle 100 rather than causing brake pads (not shown) to slow the wheels when a braking actuator is activated.

The increase in speed of the drive motors when the vehicle accelerates causes a decrease in the efficiency of the operation of the gear box due to the increase and temperature and pressure of the lubricating oil in the gear box. The efficiency decreases due to, for example, churning losses of the lubricating oil, friction losses of the rotating components, and the increase in temperature (i.e., heat dissipation). The disclosed system lowers oil level in a reservoir, and adds oil to the gear box, during a transient event. For example, the disclosed system provides for a system to temporarily add extra oil into the gearbox system during a transient event (e.g. high acceleration event) to provide for increased operational efficiency of the gears, bearings, shafts located in the gear box. The overall volume of the lubricating oil is distributed throughout the system components including the reservoir, gear box, pump and the connecting lines (e.g, pipes, conduits, etc.).

The disclosed innovative transmission system accomplishes this increase in efficiency (or, reduces the amount of decrease in deficiency) by temporarily adding a portion of lubricating oil from a reservoir to the gear box in order to increase efficiency of the gear box during a high acceleration event. The size or volume of the portion of the lubricating oil is relatively small and depends on the size of the various components of the transmission system including, for example, the overall volume of oil located in the gear box. For example, the present system preferably adds about 500 ml of lubricating oil from the reservoir toward the gear box when a high acceleration event is detected. Alternatively, the amount of oil removed from the reservoir may be between 400-600 ml or other suitable amount. The normal volume of oil in the reservoir may be about 2.5 liters. Thus, during a transient situation of high acceleration the disclosed system removes approximately 20 percent of the volume of oil from the reservoir and pumped toward the gear box.

Substantially all of the oil removed from the reservoir is added to the gear box. The added volume of oil may range from about 15 to 25 percent of the total volume of oil used during standard operating conditions depending on the size of the gear box, reservoir and oil system.

In another example, the normal volume of oil in the reservoir may be 2.3 liters and the system may be configured to transfer 500 ml of oil to the system and gear box. Thus, the transferred quantity of oil is approximately 22 percent of the system volume.

Figure 2:
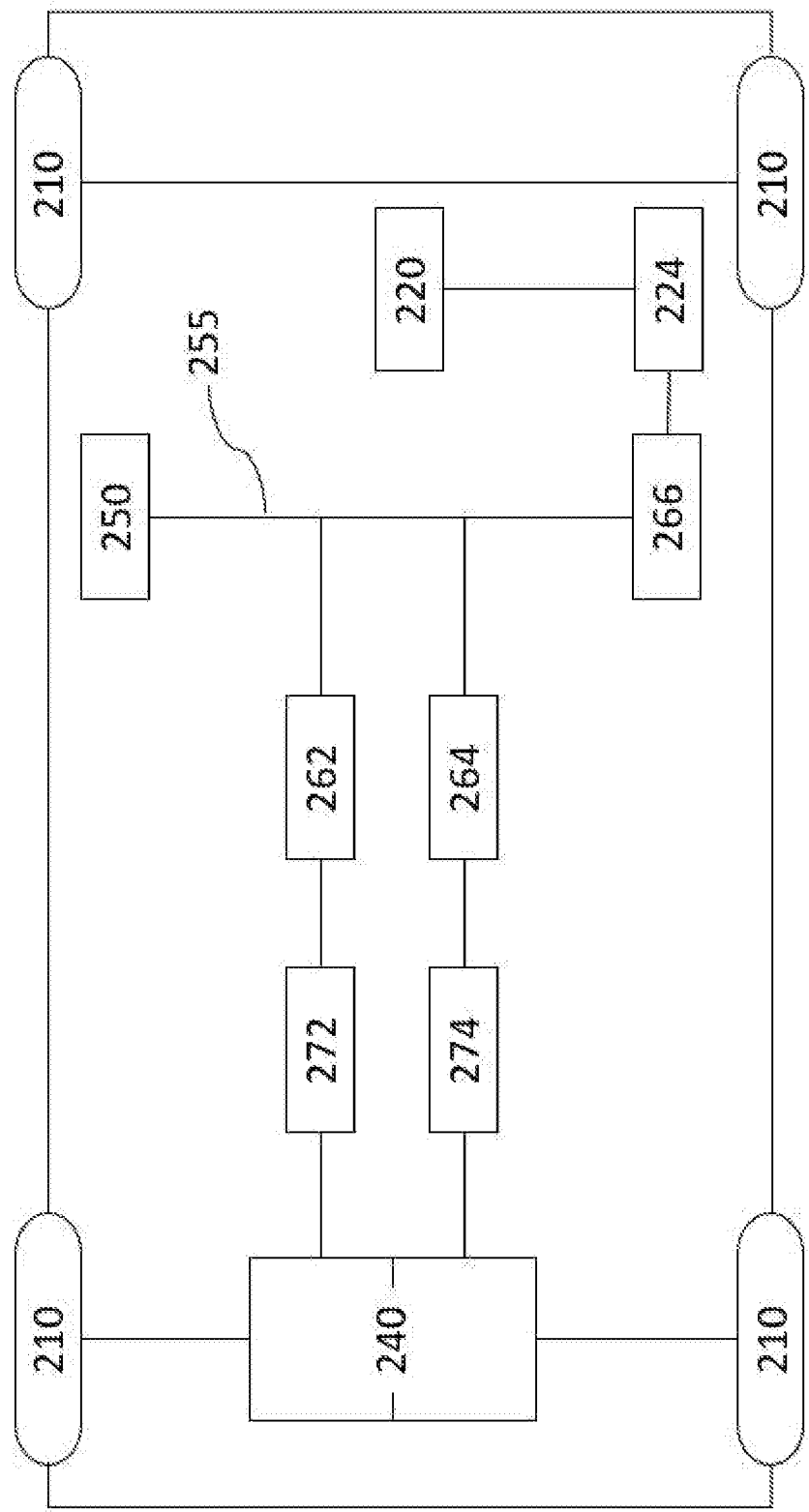
FIG. 2 is a schematic block diagram of various components of an exemplary embodiment of a power train of an electric vehicle.

FIG. 2 discloses an alternative exemplary embodiment of a power train for an electric vehicle 200 configured to be driven by a pair of propulsion motors 272, 274. Although not shown in FIG. 2, the vehicle may be an all-wheel drive (AWD) vehicle and include two or four motors and the capability of driving all four wheels simultaneously. The vehicle 200 shown in FIG. 2 operates in the same basic manner as the vehicle of FIG. 1 and may include the same variations and embodiments of the system and components described above.

The vehicle 200 may include a rechargeable energy storage system 200 (e.g., a battery). The vehicle may also include an engine 220 to provide supplemental power. The engine 220 may generally refer to any apparatus operable to augment power or range beyond the range associated with power provided by the battery 250. For example, the engine 220 may be an internal combustion engine that consumes gasoline. The storage system 250 may be, for example (but not limited to) a high-voltage battery, such as a high-voltage lithium ion battery pack. Operation of the vehicle 200 may be driven by each power source and/or both. The vehicle 200 may include multiple electrical motor/generators 272, 274 that may be operated either as drive motors that convert electrical power to rotational mechanical energy or as generators that convert rotational mechanical energy to electrical energy. The motor/generators are at times referred to simply as motors but, as described herein, include the ability to be driven to generate electricity. The motor/generators may be electrically driven and coupled to the engine 220 and the storage device 250.

According to various embodiments, the vehicle 200 includes a pair of motor/generators 272, 274 that serve to drive the front wheels 210 of the vehicle. In the regenerative braking mode the motors 272, 274 may serve as a generators to charge the storage device 250. The vehicle 200 may include a gearbox 240 located between the motor/generators 272, 274 and the front wheels 210. The gearbox 240 may be configured to be a split gear box (i.e., drive each wheel independently from separate motors), or an integrated gear box that allows one of the two motors 272, 274 to drive both wheels 210 together.

The vehicle 200 may further include a generator 224 that is driven by the engine 220 and generates power for propulsion or for charging the battery 250. As further described below, the gearbox 240 may be single speed gearboxes or multi-speed gearboxes. The motor/generators 272, 274, 224 and the battery 250 may be coupled to a common DC bus 255. In some embodiments, the generator 224 and motor/generators 272, 274 may be AC devices and electric conversion devices such as inverters 262, 264, 266 may be coupled between the motor generators and the DC bus 255. The vehicle 200 may be operated normally as a FWD vehicle.

Figure 3:
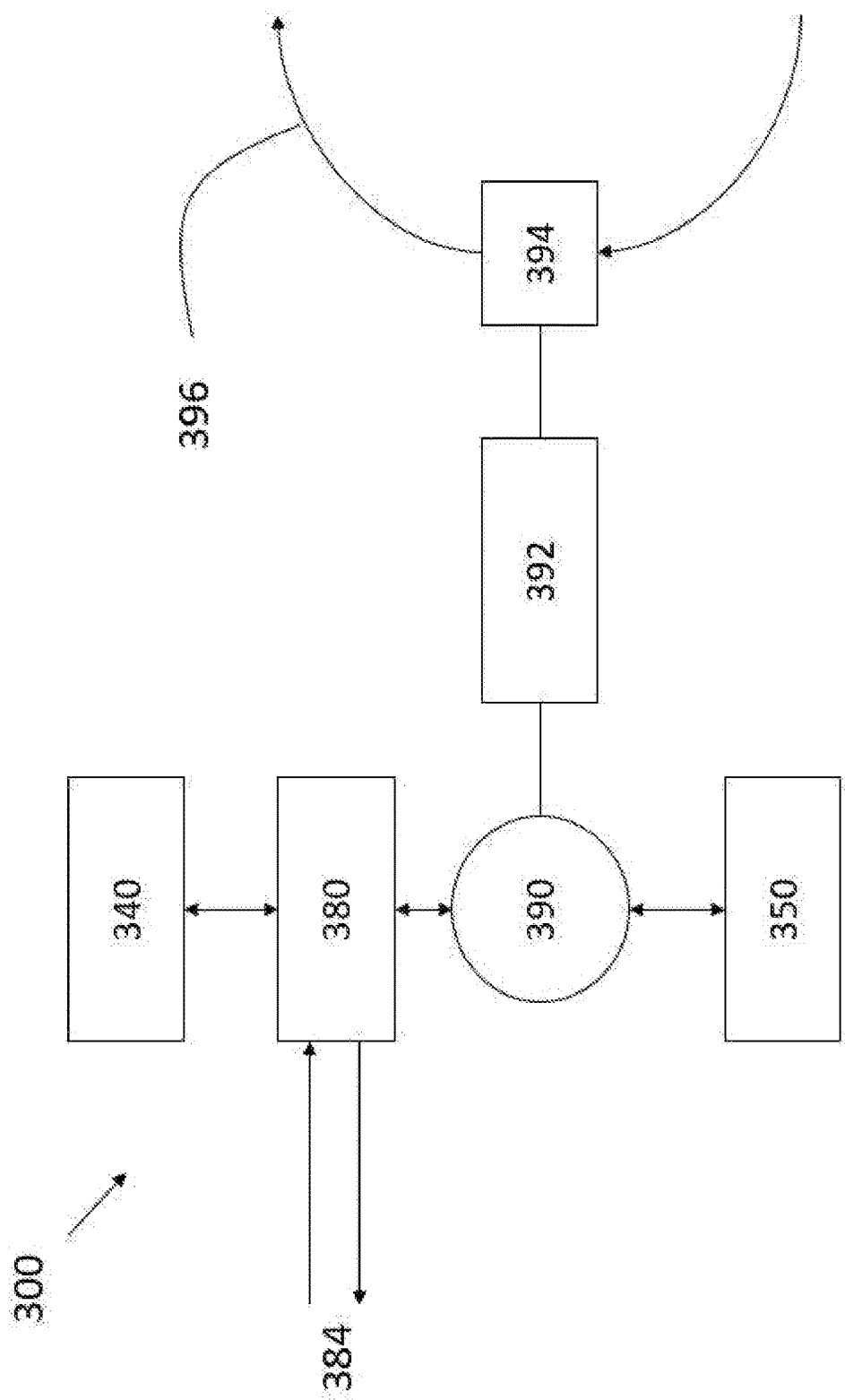
FIG. 3 is a schematic block diagram of various components of a transmission system for an electric vehicle.

FIG. 3 discloses an exemplary transmission system 300 to be used in an electric vehicle, such as those vehicles described above. However, the innovative transmission system disclosed herein is not limited to those exemplary embodiments of electric vehicles disclosed in the present application.

The disclosed transmission system 300 includes an oil reservoir 350, which can be, for instance, a dedicated oil sump for the transmission system or a sump shared with other systems that use the same lubricating fluid. The system includes a pump 390 driven by a motor 392. The pump 390 may be any suitable type such as centrifugal, positive displacement (e.g., screw type, piston type, etc.). A screw type pump is preferred. The motor 392 includes a controller 394 for controlling operation of the motor 392 and, thus, the pump 390 as well. The pump may operate to move the lubricating fluid or oil either toward or away from the components to be lubricated. The system may include various valves (not shown) to prevent the flow of oil in an undesirable direction when the pump is not operating.

The system may further include a heat exchanger 380 for cooling the lubricating fluid. The heat exchanger may include a cooling fluid 384 carried through the heat exchanger to remove heat from the fluid or oil. The lubricating fluid is provided to the gear box 340, described further below.

The system 300 may include a controller 394 for the motor 392. The controller 394 may be configured to send a receive data to other vehicle components. For example, the controller 394 may be connected to the vehicle CAN bus 396 or other similar data carrying system. The CAN bus 396 may carry information from various vehicle components and sensors such as an inertia measuring unit (e.g., an acceleration sensor in x, y and/or z directions), a vehicle speed sensor (e.g., a wheel speed sensor), a propulsion motor speed sensor, a steering angle sensor. The CAN bus may carry information regarding the acceleration of the vehicle to the controller. Alternatively, the controller 394 may be configured to determine the acceleration of the vehicle based on the information received from one or more of the vehicle sensors mentioned above.

The controller 394 may be configured so that when the vehicle acceleration is determined to be greater than a predetermined value, the controller directs the motor 392 to drive the pump 390 to remove oil from the gear box 340. The first predetermined value may be in a range of 1.0 to 1.4G. Preferably, a set point of 1.2G is used for the predetermined value. The pump 390 only operates to remove a relatively small amount of oil from the gear box for the amount of time that the vehicle acceleration is taking place. Once the vehicle acceleration has returned below a second predetermined value the pump operates to return the removed quantity of oil to the gear box from the reservoir 350. The second predetermined value is preferably in the range of 3.5 to 6.5G. The preferred value of the second predetermined value is 0.5G. Thus, the lubrication of the components in the gear box is not jeopardized due to the small volume of oil removed, the short time duration of reduction of volume of oil in the gearbox, and the relative high pressure of the oil remaining in the gear box during the high acceleration event.

Figure 4:
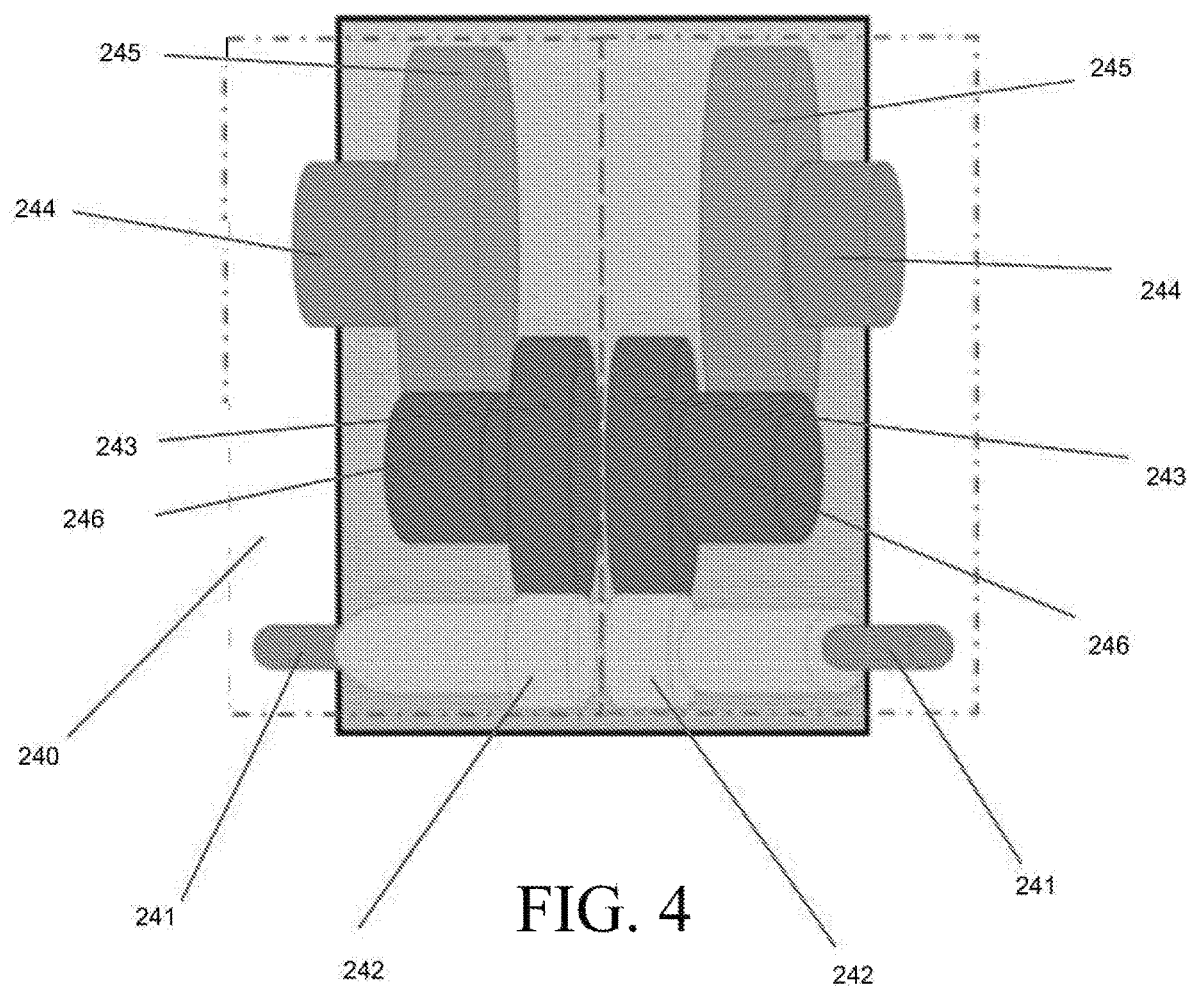
FIG. 4 is a schematic end view of two gears of a gear box coupled to a drive train in accordance with various disclosed embodiments.

FIG. 4 shows the internals of an exemplary gear box 240. In the exemplary embodiment, a propulsion motor (172, 174, 272, 274) includes a drive shaft 241 that drives a motor gear 242. Each motor gear 242 drives a larger gear 243 that is connected to a smaller gear 246 that engages a wheel gear 245 that is connected to drive shaft 244 for each of the wheels. The drive shaft may alternatively be connected to a differential (132, 134). In alternative embodiments, the gear box may container more gears depending on the use of the vehicle (e.g., grades encountered, top desired speed, etc.). The split gear box shown in FIG. 4 is exemplary only. In alternative embodiments, the gear box may be cross-connected internally to allow one motor to drive both wheels.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the transmission system and electric vehicle shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A method comprising:
receiving sensor information from a motor speed sensor of a vehicle, the sensor information representing a motor speed of an electric motor of the vehicle, the vehicle including a transmission that comprises:
a gearbox containing a volume of lubricating fluid; and
a pump fluidly connected to the gearbox;
determining a current acceleration of the vehicle based on the received sensor information representing the motor speed of the electric motor of the vehicle;
determining that the current acceleration of the vehicle is greater than a first predetermined acceleration level; and
in response to determining that the current acceleration of the vehicle is greater than the first predetermined acceleration level, starting operation of the pump to remove a portion of the volume of lubricating fluid from the gearbox, wherein the pump continuously operates while the current acceleration of the vehicle is greater than the first predetermined acceleration level.

2. The method of claim 1, wherein:
the transmission further comprises a reservoir fluidly connected to the pump and the gearbox; and
starting operation of the pump to remove the portion of the volume of lubricating fluid from the gearbox comprises operating the pump to move the portion of the volume of lubricating fluid from the gearbox to the reservoir.

3. The method of claim 1, where the operations further comprise:
determining that the current acceleration of the vehicle is less than a second predetermined acceleration level, the second predetermined acceleration level less than the first predetermined acceleration level; and
in response to determining that the current acceleration of the vehicle is less than the second predetermined acceleration level, operating the pump to return the portion of the volume of lubricating fluid to the gearbox.

4. The method of claim 3, wherein the second predetermined acceleration level is equal to a g-force of at least 0.5.

5. The method of claim 3, wherein the second predetermined acceleration level is less than or equal to a g-force of 1.0.

6. The method of claim 1, wherein the first predetermined acceleration level is equal to a g-force of at least 1.0.

7. The method of claim 1, wherein the pump comprises a screw-type pump.

8. The method of claim 1, wherein the gearbox comprises a single speed gearbox.

9. The method of claim 1, wherein the gearbox comprises a multi-speed gearbox.

10. A vehicle comprising:
a transmission comprising:
a gearbox containing a volume of lubricating fluid; and
a pump fluidly connected to the gearbox;
an electric motor;
a motor speed sensor; and
a controller in communication with the motor speed sensor and the transmission, the controller performing operations comprising:
receiving sensor information from the motor speed sensor, the sensor information indicating a motor speed of the electric motor;
determining a current acceleration of the vehicle based on the received sensor information representing the motor speed of the electric motor;
determining that the current acceleration of the vehicle is greater than a first predetermined acceleration level; and
in response to determining that the current acceleration of the vehicle is greater than the first predetermined acceleration level, starting operation of the pump to remove a portion of the volume of lubricating fluid from the gearbox, wherein the pump continuously operates while the current acceleration of the vehicle is greater than the first predetermined acceleration level.

11. The vehicle of claim 10, wherein:
the transmission further comprises a reservoir fluidly connected to the pump and the gearbox; and
starting operation of the pump to remove the portion of the volume of lubricating fluid from the gearbox comprises operating the pump to move the portion of the volume of lubricating fluid from the gearbox to the reservoir.

12. The vehicle of claim 10, where the operations further comprise:
determining that the current acceleration of the vehicle is less than a second predetermined acceleration level, the second predetermined acceleration level less than the first predetermined acceleration level; and
in response to determining that the current acceleration of the vehicle is less than the second predetermined acceleration level, operating the pump to return the portion of the volume of lubricating fluid to the gearbox.

13. The vehicle of claim 12, wherein the second predetermined acceleration level is equal to a g-force of at least 0.5.

14. The vehicle of claim 12, wherein the second predetermined acceleration level is less than or equal to a g-force of 1.0.

15. The vehicle of claim 10, wherein the first predetermined acceleration level is equal to a g-force of at least 1.0.

16. The vehicle of claim 10, wherein the pump comprises a screw-type pump.

17. The vehicle of claim 10, wherein the gearbox comprises a single speed gearbox.

18. The vehicle of claim 10, wherein the gearbox comprises a multi-speed gearbox.

\* \* \* \* \*